United States Patent [19]
DeLong

[11] Patent Number: 6,061,158
[45] Date of Patent: May 9, 2000

[54] HIGH CAPACITY WAVELENGTH DIVISION MULTIPLEXER

[75] Inventor: Raymond K. DeLong, Palos Verdes Estates, Calif.

[73] Assignee: TRW Inc., Redondo Beach, Calif.

[21] Appl. No.: 08/962,956

[22] Filed: Nov. 4, 1997

[51] Int. Cl.$^7$ ...................................................... H04J 14/02
[52] U.S. Cl. .......................................... 359/133; 359/187
[58] Field of Search .................................. 359/124, 125, 359/130, 132, 133, 187, 180

[56] References Cited

U.S. PATENT DOCUMENTS

| | | | |
|---|---|---|---|
| 4,942,568 | 7/1990 | Khoe et al. | 359/133 |
| 5,978,119 | 11/1999 | Giles et al. | 359/132 |
| 5,995,255 | 11/1999 | Giles | 359/124 |

*Primary Examiner*—Leslie Pascal
*Attorney, Agent, or Firm*—Michael S. Yatsko

[57] ABSTRACT

Method and apparatus for spatially combining a large number of optical signals of different wavelengths carried on optical fibers (12) from laser sources (10). A dispersive optical device, disclosed as a grating (16), combines the multiple signals into a composite beam. Then a sample of the composite beam is analyzed by passing it through tunable etalon (26) and onto a sensor (30). The etalon (16) is successively tuned to passbands, each of which corresponds to the wavelength of each of the optical signals in turn. The sensor (30) measures angular deviation of each beam caused by wavelength changes, and generate control signals (on lines 36) to adjust each wavelength at its laser source. Thus the apparatus provides for reliable multiplexing of a relatively large numbers of laser sources (10), while the etalon (16) and sensor (30) operate in conjunction with a controller (32), which also generates wavelength control signals for the lasers (10), to ensure accurate beam alignment and more efficient multiplexing.

5 Claims, 1 Drawing Sheet

HIGH CAPACITY WAVELENGTH DIVISION MULTIPLEXER

BACKGROUND OF THE INVENTION

This invention relates generally to optical wavelength division multiplexing and, more particularly, to a technique for combining multiple signals of different wavelengths, on separate optical fibers, into a single beam for transmission along a single optical fiber or through space. The invention has application in high capacity laser communication systems.

Dispersive gratings and prisms have been used in the past for optical wavelength multiplexing, as have dichroic beam splitters, but the techniques of the prior art are either unsuitable for large numbers of input channels, or are grossly inefficient from an energy standpoint.

Typically, optical signals to be multiplexed are made available on separate optical fibers, from which light cannot be easily launched into a single fiber. Moreover, although the individual fibers are small, ends of closely spaced fibers nevertheless emit light from different spatial locations. Another difficulty is that the nominal wavelength of each laser source may drift in value as temperature and other parameters change with time. Any variation in the wavelengths adversely affects the alignment of optical components used for wavelength multiplexing when combined with a dispersive approach. Accordingly, there is still a need for an optical wavelength multiplexer capable of handling a relatively large number of inputs and reliably producing an output beam that is kept aligned by controlling drift in wavelength. The present invention satisfies these requirements.

SUMMARY OF THE INVENTION

The present invention resides in a high-capacity wavelength multiplexer and a method for its use. Briefly, and in general terms, the wavelength multiplexer of the invention comprises an optical dispersive device; and means for directing multiple light beams of different wavelengths onto the dispersive device at wavelength-dependent angles of incidence. The dispersive device provides a composite output beam including multiple beams at the different wavelengths propagating along a substantially common path. The multiplexer further comprises a tunable optical bandpass filter positioned to receive at least a portion of the composite beam; means for tuning the optical bandpass filter to successive settings corresponding to the different wavelengths of the multiple light beams; a sensor, positioned to provide a measure of beam angle difference from the common light path for successive beams emitted from the tunable optical bandpass filter, the measure of beam angle difference being indicative of wavelength error; and means for generating a light source control signal from each measure of beam angle difference provided by the sensor. The light source control signals provide feedback of wavelength correction signals, and thereby maintain the separate beams in alignment.

In the illustrative embodiment of the invention the optical dispersive device is a dispersive grating and the composite beam is reflected from the grating. The tunable optical bandpass filter in the illustrative embodiment includes a tunable etalon, and the sensor is a bi-cell sensor positioned to detect angular deflection of output light from the tunable etalon. The means for directing the multiple beams onto the grating includes a collimating lens, and the preferred form of the multiplexer further includes a mirror placed in the path of the composite beam returned from the grating, and a beam splitter positioned in the substantially common path to provide a sample beam from the composite beam, for use in the tunable etalon. The sensor measures angular difference of the etalon output beam from a nominal angle, the difference being indicative of wavelength error in a source laser corresponding to the output beam. The preferred form of the multiplexer also includes a controller for tuning the etalon to successive narrow bandwidths corresponding to each of the laser wavelengths in turn, and for generating laser control signals from the difference measurements obtained from the sensor. The source lasers are separately controlled in wavelength to minimize this measured angular difference and to facilitate wavelength division multiplexing of the beams.

The invention may also be defined in terms of a method for wavelength division multiplexing a large number of laser light beams, the method comprising the steps of generating multiple laser beams from separate controllable laser sources; launching the multiple laser beams into separate optical fibers; emitting multiple laser beams from the separate optical fibers arrayed in wavelength sequence; collimating the emitted laser beams and directing the collimated beams onto a dispersive grating, at angles of incidence that are wavelength dependent; reflecting light from the grating in a composite beam propagating over a substantially common return path; splitting off a sample beam from the composite beam; passing the sample beam through a tunable etalon for narrow bandpass filtering; controlling the tunable etalon to provide a succession of output beams corresponding in wavelength to the wavelengths of a succession of the laser sources operating at different wavelengths; measuring angular difference in the succession of etalon output beams, wherein angular difference is indicative of wavelength error; and controlling the wavelengths of the laser sources in accordance with the measured angular difference for each etalon output beam, whereby the source laser wavelengths are controlled to provide reliable multiplexing of the laser beams.

It will be appreciated from the foregoing summary that the present invention represents a significant advance in the field of wavelength division multiplexers. In particular, the invention provides for multiplexing a relatively large number of separate optical signals of different wavelengths. Efficient multiplexing is accomplished in the invention by spatially merging the separate beams using a dispersive optical device, and maintaining beam alignment by continually adjusting the wavelengths of the laser sources from which the signals are derived. Other aspects and advantages of the invention will become apparent from the following more detailed description, taken in conjunction with the drawings.

DESCRIPTION OF THE PREFERRED EMBODIMENT

Figure 1:
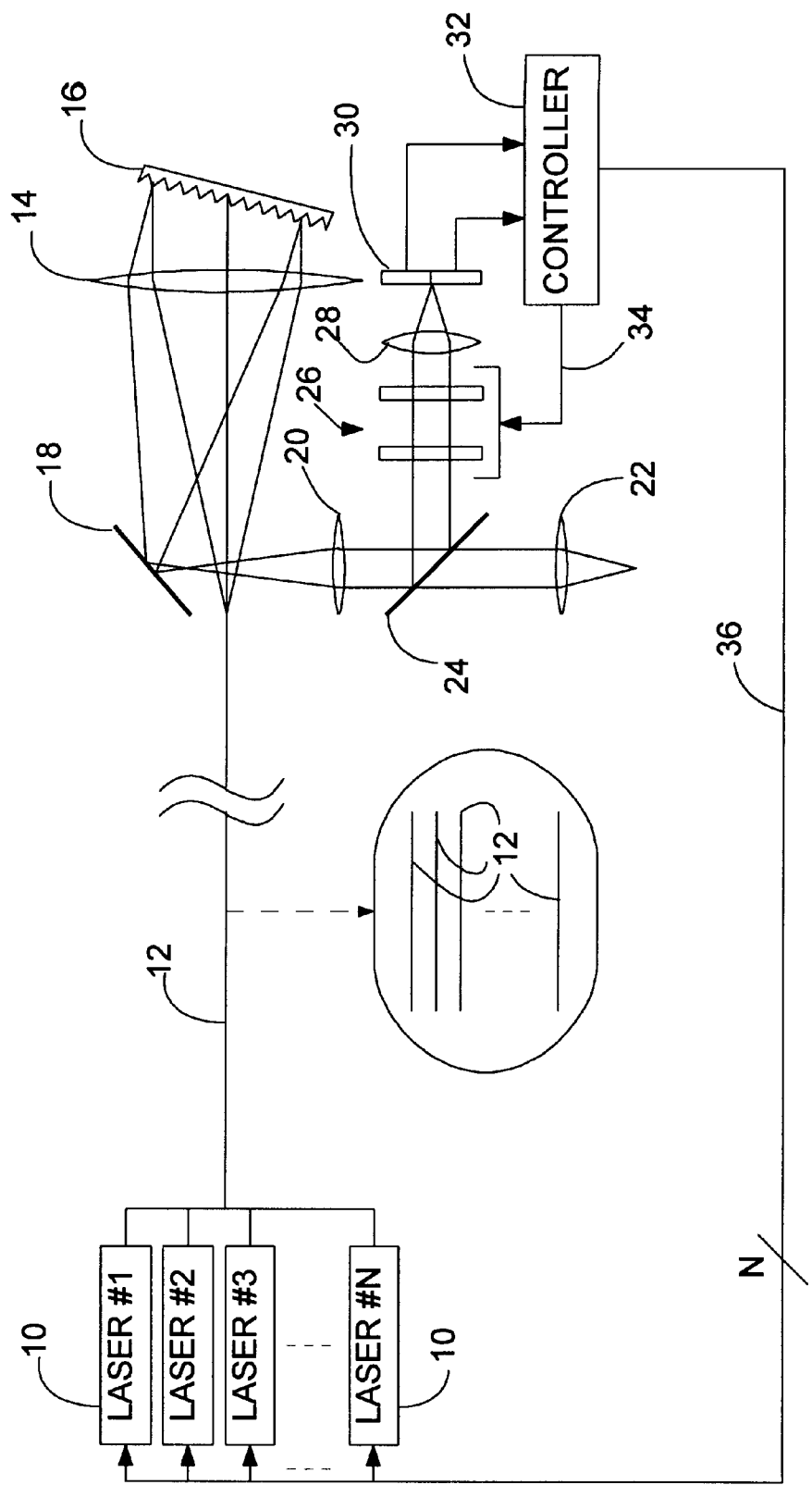
FIG. 1 is block diagram showing the essential features of the invention.

As shown in the drawings for purposes of illustration, the present invention pertains to optical wavelength division multiplexing of a relatively large number of optical communication channels, such as 20-40 channels. Although dispersive devices, such as gratings and prisms, have been suggested for use in wavelength division multiplexers, techniques used prior to this invention have not been able to perform the multiplexing function efficiently for large numbers of channels.

In accordance with the present invention, a dispersive device is used to spatially merge multiple optical input beams of different wavelengths, and a tunable etalon is used to maintain wavelength stability for multiple laser sources from which the input beams are derived.

As shown in FIG. 1, multiple lasers, indicated by reference numeral 10, provide optical beams to multiple optical fibers 12. In a communication application, the beams would be separately modulated with an information signal of some kind, but this is not pertinent to the present invention and is not, therefore, shown in the drawing. Each laser 10 has a different nominal wavelength. As is well known, a laser produces a coherent and essentially monochromatic light beam, but the laser wavelength is subject to drift with changing operating temperature and variations in electrical current. If the multiple beams, forming multiple communication channels, can be combined into one beam, they may then be more efficiently transmitted to a destination location, either over a single optical fiber or through space. At the destination, the separate channels can be recovered by wavelength division demultiplexing. For a small number of channels, the beams in the separate fibers 12 may be combined using simple optical components to launch the separate beams into a single fiber or as a single beam in space. As the number of input channels increases, this approach becomes less practical.

In the apparatus of the invention, light emitted from each of the ends of the fibers 12 expands in an approximately conical shape and is collimated by a first lens 14. The collimated beams then impinge on a dispersive grating 16. Dispersive gratings provide an angle of reflection that is wavelength-dependent. If the ends of the fibers 12 are disposed in a linear array in order of increasing wavelength, the grating 16 can be selected and located such that the reflected beams for the several wavelengths lie on a return common path. Moreover, if the grating 16 is appropriately tilted, the reflected beams will be focused by the first lens 14 onto a mirror 18 located at a position that is offset slightly from the light paths toward the grating. The composite beam reflected from the mirror 18 passes through a second collimating lens 20, and may then be transmitted to a receiver location (not shown). If the composite beam is to be launched into a single optical fiber, the apparatus may further include another lens 22, for focusing the beam down to a small diameter for alignment with a single fiber.

In accordance with another important aspect of the invention, part of the collimated beam from the second collimating lens 20 is split off, using a beam splitter 24, and directed into tunable etalon 26. An etalon includes an optical cavity that functions as a narrow optical bandpass filter. In a tunable etalon, at least one end mirror of the cavity is movable to tune the device to a desired wavelength. Light output from the tunable etalon 26 is focused by another lens 28 onto a sensor bi-cell 30. The bi-cell 30 has two adjacent light detectors, the outputs of which are connected to a controller 32.

The controller 32 performs the following functions:
(a) The controller 32 generates control signals on line 34 to cycle the tunable etalon 26 through successive frequency band settings corresponding to the nominal wavelengths of the lasers 10.
(b) At each successive frequency band setting, the controller 32 receives input signals from the bi-cell 30. If the laser corresponding to the currently selected frequency band of the etalon 26 is correctly tuned to its designated wavelength, and if all the optical components are in alignment, the output light beam from the etalon 26 will be focused by the lens 28 onto the center of the bi-cell 30, which will produce balanced outputs from its two detectors. If the laser wavelength is too low or too high, the grating 16 will reflect light from that laser at a slightly different angle and light from the etalon 26 will not impinge on the center of the bi-cell, which will then produce unbalanced output signals.
(c) The controller 32 generates feedback control signals on lines 36 back to the lasers 10. The output wavelength of each laser 10 can be controlled to limited degree by changing the temperature, current, or both. The feedback control signals on lines 36 provide negative feedback for each of N control loops, where N is the number of lasers being controlled. Each laser 10 is controlled in such a manner as to balance the output of the bi-cell 30 when that particular laser's output is being tuned in by the etalon 26. Thus, each laser 10 is controlled to generate only its designated wavelength, and any wavelength drift is minimized. With each laser being wavelength controlled to a fairly high degree of precision, the multiple laser beams are reliably and efficiently aligned and multiplexed into a single fiber or beam.

It will be appreciated from the foregoing that the present invention represents a significant advance in the field of optical wavelength division multiplexing. In particular, the invention includes the combination of a dispersive optical device to provide spatial convergence of multiple input beams of different wavelength, and a tunable etalon to provide control signals for wavelength tuning of multiple lasers from which the input beams are derived. It will also be appreciated that only one embodiment of the invention has been described for purposes of illustration, and that various modifications may be made without departing from the spirit and scope of the invention. It will be understood, for example, that the term "optical" encompasses wavelengths outside the visible optical region of the electromagnetic spectrum, such as in the infrared and ultraviolet regions. Accordingly, the invention should not be limited except as by the appended claims.

What is claimed is:

1. A high-capacity wavelength division multiplexer, comprising:

an optical dispersive device;

means for directing multiple light beams of different wavelengths onto the dispersive device at wavelength-dependent angles of incidence, wherein the dispersive device provides a composite output beam including multiple beams at the different wavelengths propagating along a substantially common path;

a tunable optical bandpass filter positioned to receive at least a portion of the composite beam;

means for tuning the optical bandpass filter to successive settings corresponding to the different wavelengths of the multiple light beams;

a sensor, positioned to provide a measure of beam angle difference from the common light path for successive beams emitted from the tunable optical bandpass filter, the measure of beam angle difference being indicative of wavelength error; and means for generating a light source control signal from each measure of beam angle difference provided by the sensor, for wavelength correction.

2. A wavelength division multiplexer as defined in claim 1, wherein:
the optical dispersive device is a dispersive grating and the composite beam is reflected from the grating.

3. A wavelength division multiplexer as defined in claim 1, wherein:
the tunable optical bandpass filter includes a tunable etalon; and
the sensor is a bi-cell sensor positioned to detect angular deflection of output light from the tunable etalon.

4. A wavelength division multiplexer, comprising:
a dispersive grating;
optical components, including a collimating lens, for directing multiple laser light beams from source lasers operating at different wavelengths onto the grating, along wavelength-dependent angles of incidence;
additional optical components, including a mirror, placed in the path of a composite beam returned from the grating along a substantially common path;
a beam splitter positioned in the substantially common path to provide a sample beam from the composite beam;
a tunable etalon positioned in the sample of the beam and providing an output beam at a selected narrow bandwidth corresponding to each of the source lasers in turn;
a sensor for measuring angular difference of the etalon output beam from a nominal angle, the difference being indicative of wavelength error in the source laser corresponding to the output beam; and
a controller for tuning the etalon to successive narrow bandwidths corresponding to each of the laser wavelengths in turn, and for generating laser control signals from the difference measurements obtained from the sensor, whereby the source lasers are controlled in wavelength to minimize angular difference and to facilitate wavelength division multiplexing of the separate beams.

5. A method for wavelength division multiplexing a large number of laser light beams, the method comprising the steps of:
generating multiple laser beams from separate controllable laser sources;
launching the multiple laser beams into separate optical fibers;
emitting multiple laser beams from the separate optical fibers arrayed in wavelength sequence;
collimating the emitted laser beams and directing the collimated beams onto a dispersive grating, at angles of incidence that are wavelength dependent;
reflecting light from the grating in a composite beam propagating over a substantially common return path;
splitting off a sample beam from the composite beam;
passing the sample beam through a tunable etalon for narrow bandpass filtering;
controlling the tunable etalon to provide a succession of output beams corresponding in wavelength to the wavelengths of a succession of the laser sources operating at different wavelengths;
measuring angular difference in the succession of etalon output beams, wherein angular difference from a nominal angle is indicative of wavelength error; and
controlling the wavelengths of the laser sources in accordance with the measured angular difference for each etalon output beam, whereby the source laser wavelengths are controlled to provide reliable multiplexing of the laser beams.

* * * * *